Aug. 7, 1962  M. R. BLAND  3,048,277
GRID FOR DIRT TRAP SUMP
Filed March 10, 1959  4 Sheets-Sheet 1

INVENTOR.
MARSHALL R. BLAND

INVENTOR.
MARSHALL R. BLAND

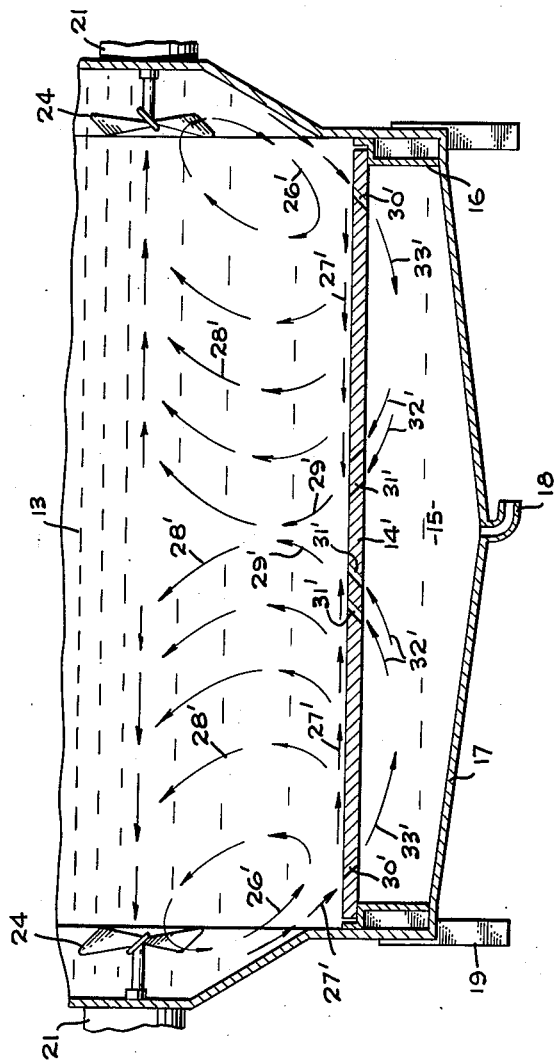

Aug. 7, 1962 M. R. BLAND 3,048,277
GRID FOR DIRT TRAP SUMP
Filed March 10, 1959 4 Sheets-Sheet 4

INVENTOR.
MARSHALL R. BLAND

3,048,277
GRID FOR DIRT TRAP SUMP
Marshall R. Bland, La Habra, Calif.
Filed Mar. 10, 1959, Ser. No. 798,353
4 Claims. (Cl. 210—523)

This invention relates to a new and novel grid for a dirt trap type sump used on agitated cleaning equipment or other applications wherein it is desirable to remove suspended solids from a highly agitated fluid.

In the past, it has been the usual practice to attempt to remove particulate matter from a cleaning fluid employed in agitated tanks by placing a sump immediately below the body of cleaning fluid and separating the sump from the main body of fluid by means of a grid, constructed of wire screen or a grating. It is the characteristic of all heretofore used grids that the area of space between the wires of the screen or the structural members of the grating be as great as possible, commensurate with structural requirements. This conclusion was based upon the logic that the greatest area of contact between the main body of the fluid and the sump would permit the most rapid settling of the particulate matter contained in the fluid, which matter had been removed from the object being cleaned. It was also believed that any horizontal surface in the place of the grid was disadvantageous as the particulate matter would settle on this surface rather than fall into the sump and therefore remain in the main body of the fluid when the agitation was commenced.

Although this type of sump grid was partially effective in removing the particulate matter from the body of the cleaning fluid, it had certain inherent disadvantages which limited its usefulness.

The principal disadvantage was the tendency of the grid to create turbulence over its entire surface when the solution was agitated. This turbulence caused the solution below the grid in the sump area to be agitated; thereby stirring up the sediment in the sump and returning it in part to the main body of the cleaning fluid.

Another disadvantage was the high power consumption required to achieve adequate cleaning because of the lost power absorbed by the turbulent fluid adjacent to the grid area; which power was consumed in the form of heat rather than in agitation adjacent to the parts to be cleaned.

Another disadvantage was the excessive depth required for the sump to avoid as far as possible the return of the settled particulate matter from the sump into the main body of the fluid.

I have found that all of these disadvantages can be overcome if an almost solid plate is employed in place of the open type screen grid. In the plate, a small number of strategically placed holes or slots are used for communication between the liquid in the main body of the cleaning fluid and the sump. The slots are so placed in the plate that certain slots are adjacent to the source of power, that is, the impeller or propeller, and other holes or slots are placed near the middle of the tank, or at a point of minimum velocity of flow across the grid.

It is the principle of my invention that the velocity of the cleaning fluid immediately adjacent to the source of power is much higher than at any other place in the tank. Therefore, as the fluid moves parallel to the surface of the plate, the static pressure normal to the plate at the point of discharge is much lower than at any other point on the plate, in accordance with Bernoulli's Principle. Therefore, fluid from the sump will tend to be aspirated up into the flow stream. As the velocity of the flow near the center of the tank, or at a maximum distance from the source of agitation is much lower, the static pressure normal to the plate will be much higher than at the edges adjacent to the source of power and as the fluid is aspirated from the sump into the stream of flow adjacent to the source of power, replacement fluid for the sump, which is of constant volume, will be sucked into the holes near the middle of the tank. Therefore, there is a continuous movement of fluid in the sump from the center to the sides. As the entrance and discharge holes are relatively small in comparison to the total sump area, the velocity of flow of fluid through the sump will be relatively low, permitting the fluid which has entered the sump from the main body of cleaning fluid to discharge its particulate matter in the sump by means of gravity and without disturbing material which has settled out from the solution in the sump.

The converse of this principle is also true; that is, if the high velocity fluid is forced into the sump in a fine stream by means of a baffle placed immediately adjacent to the high velocity fluid flow or by means of slots or holes in the grid, placed immediately adjacent to the source of power, which slots or holes are placed at an angle to the normal, which angle is inclined toward the direction of flow, a minor part of the stream of flow will be forced into the sump area, then in accordance with Bernoulli's Principle, the fluid will flow out the grid at holes located in areas of reduced velocity, thereby maintaining the principle of conservation of total pressure head, expounded by Bernoulli.

The advantages and characteristics of my invention will be more fully understood with reference to the drawings.

FIG. 2a is a partial view of a cleaning tank according to the invention, similar to FIG. 2, showing a modification of the form of grid illustrated in FIG. 2.

Figure 1:
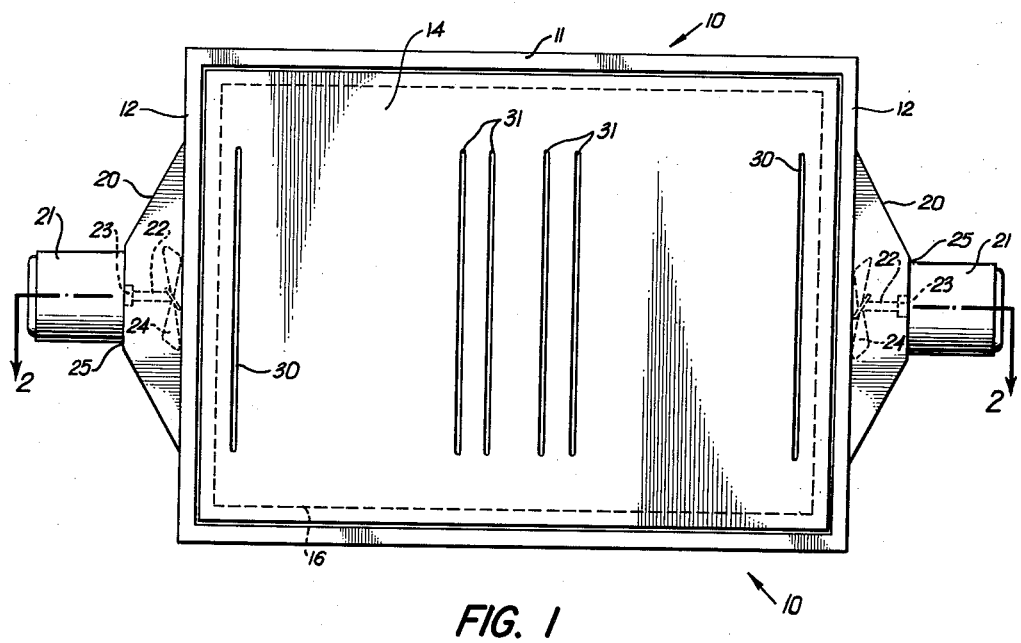
FIG. 1 is a top view of a cleaning tank showing one modification of the grid in place.
Figure 2:
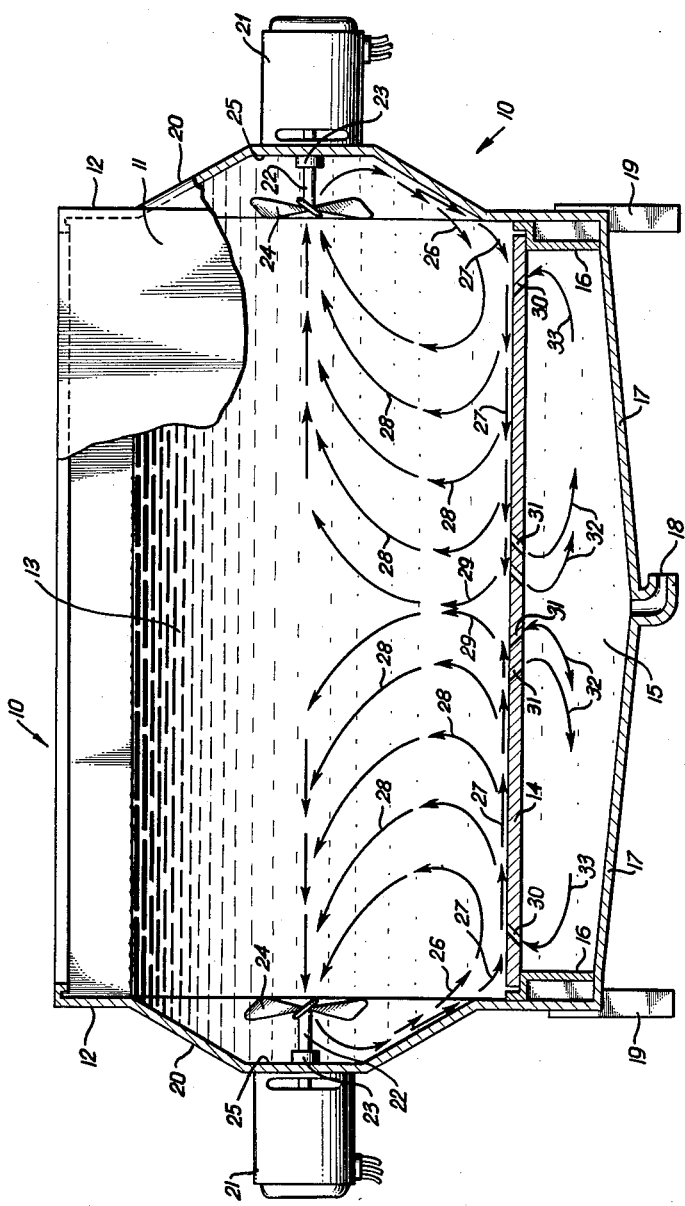
FIG. 2 is a side view of FIG. 1 partially broken away along line 2—2 of FIG. 1 to illustrate the interior construction and the flow of fluid over the grid; for purposes of clarity, only the flow in the bottom one-half of the cleaning zone is illustrated.

Referring to FIGS. 1 and 2, the cleaning tank 10 has a rectangular opening in the top formed by vertical opposite ends 11 and opposite sides 12 together forming the cleaning zone 13 for containing the cleaning solution and receiving the objects to be cleaned. At the bottom of the cleaning zone is a grid 14 which separates the cleaning zone 13 from the sump area 15. The sump area is formed by the ends 11, retaining structure 16 for holding the grid 14 and the bottom plates 17 which are sloped gently from the side wall 12 to the center to permit drainage of the tank through outlet 18 which is connected to a suitable valve and lines, not shown, for discharge of the cleaning solution. The entire cleaning tank is mounted on legs 19 which are of sufficient height to provide access to outlet 18.

Integrally attached to and forming part of the sides 12 is a truncated pyramid 20 to which is attached an electric motor 21 which has a shaft 22 passing through the wall 25 of truncated pyramid 20 and which shaft is sealed with a liquid tight seal 23. Inside the tank, the shaft 22 is connected to a propeller 24 which is rotated by the motor 21 to produce agitation in the cleaning fluid contained in cleaning area 13.

When the propellers 24 are rotated so as to force the cleaning fluid against the retaining wall, the fluid strikes the wall and is discharged as shown by flow lines 26 and 27. Line 26 indicates that part of the fluid is discharged away from the pyramided retaining wall 20 and directly back into the main body of the fluid; however, as the liquid is traveling at a very high rate of speed immediately after discharge, this high velocity produces a greatly reduced static pressure normal to the retaining wall 20 in accordance with Bernoulli's law, thereby causing the stream to hug the retaining wall as represented by flow lines 27. As the fluid movement along the retaining wall 20 and grid 14 decreases in velocity resulting from friction between the fluid and the retaining surfaces, the static pressure differential decreases and a portion of the fluid tends to return to the main body as represented by flow lines 28. By the time the opposite flow patterns meet, as represented by flow lines 29, the velocity along the surface of the grid 14 has been greatly reduced. For sake of clarity, the flow pattern has been shown for only the bottom half of the flow pattern, it being understood that a flow pattern of essentially the same design could be used to represent the flow in the top one-half of the tank.

The grid 14 is essentially a flat plate of steel of uniform thickness which has been perforated over part but not all of its length with slots 30 adjacent to the power source and in a plane parallel to the side 12. The slot 30 is shown disposed at an angle to the vertical, which angle has its horizontal component in the same direction as the flow thereby preventing the flow of high velocity fluid, as presented by lines 27 from entering the sump area 15 at this point. Near the center of the tank, two pairs of slots 31 are shown. These slots are each essentially of the same dimensions as slots 30 but disposed at an angle to the vertical such that they do have a horizontal component in a direction opposite to the flow of fluid as represented by lines 27 such that any fluid passing over these slots in the direction as shown by lines 27 will tend to cause a part of the fluid to flow into slots 31.

It is the principle of my invention, that as the fluid flows past slot 30, the velocity of the fluid will be very high, thus causing an aspirating effect upon the fluid in the sump and tending to draw the fluid from the sump into the cleaning area 13. As the fluid movement represented by line 27 moves further away from side 12, the velocity of the fluid decreases and therefore as the fluid passes over slots 31, there will be much less tendency to aspirate the fluid from the sump 15 and as the slots 31 are disposed at an angle such that the angle has a horizontal component opposite to the flow of fluid, there will be a tendency to force fluid into the sump 15 by flowing fluid over slots 31. Therefore, there is a tendency for the fluid to flow in slots 31, from slots 31 into the sump tank 15 and follows flow lines 32 and ultimately to be discharged as represented by flow lines 33 through slot 30 back into the main body of cleaning fluid 13. As the volume of solution flowing through slots 31 is relatively small in comparison to the volume of the sump 15, the velocity of fluid flow in the sump 15 will be very low, permitting the particulate matter to settle out in the sump 15 so that particulate-free cleaning solution is returned to the main body of the cleaning fluid 13 through slot 30.

Referring to FIG. 2a, the modified grid 14' is similar in construction to that of grid 14 except that the slots 30' adjacent to the power source or propeller 24 are inclined in a direction opposite to slots 30 of grid 14, and the slots 31' near the center of grid 14' are inclined in a direction opposite to slots 31 of grid 14. That is, slots 30' are disposed at an angle to the vertical having a horizontal component above the grid in a direction opposite to the flow of the high velocity fluid in the main tank 13 discharged from the propellers 24, as represented by flow lines 27', and slots 31' have a horizontal component above the grid in the same direction as the flow of fluid in the main tank, as represented by flow lines 27'. Thus, as the fluid in the main tank flows past slots 30', a minor portion of such fluid is forced from the main tank through slots 30' into the sump 15, and the particulate matter in the fluid so entering the sump will be discharged therein as described above. Simultaneously with entry of fluid into the sump via slots 30', a corresponding amount of fluid is displaced from the sump and flows through the slots 31' into the main cleaning zone 13 adjacent the central portion thereof in the areas of minimum fluid agitation or velocity. Flow lines 26', 27', 28' and 29' in FIG. 2a correspond to the fluid flow lines 26, 27, 28 and 29, respectively, in FIG. 2.

Figure 3:
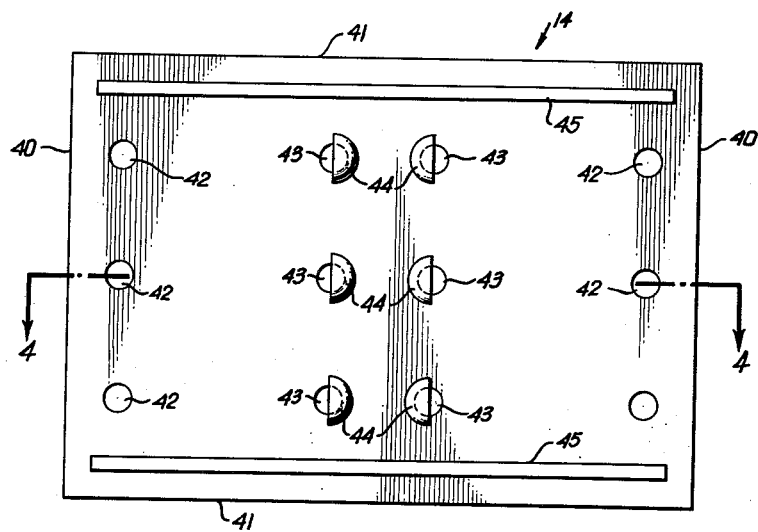
FIG. 3 is a plan view of another modification of the grid illustrating the types of holes and baffles which may be employed.
Figure 4:
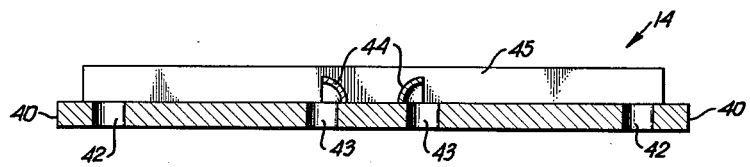
FIG. 4 is a cross-section of FIG. 3 along line 4—4.

With reference to FIG. 3 and FIG. 4, the grid 14 is a flat plate with opposite sides 40 and opposite ends 41. The grid 14 is placed in the tank such that the power-agitators are located adjacent to sides 40 such that the direction of flow along the surface of grid 14 is parallel to ends 41. A series of holes 42 have been drilled through the grid in line adjacent to sides 40. The solution passes over these holes at a very high velocity and aspirates the solution from the sump up into the flow stream in the cleaning area. Near the center of the grid in relationship to the sides 40 is another series of holes 43 which are arranged in two rows parallel to the sides 40 and a short distance on either side of the center line of the grid; fixably mounted to the grid and above the respective holes 43 are quadrants of spheres which are used as deflector plates 44 to direct the fluid into the sump as it flows against the deflector. Fixably mounted adjacent to and parallel to ends 41 are a pair of basket rests 45 which are of sufficient height to permit the passage of fluid under the parts basket or work being cleaned so that there is a uniform uninterrupted flow of fluid over the grid 14.

Figure 5:
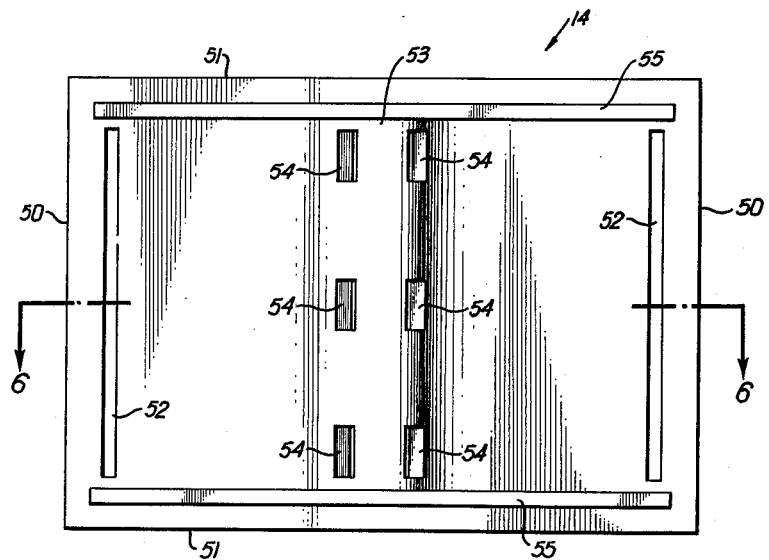
FIG. 5 is a plan view of yet another modification of a grid incorporating an integral ridge in the center of the plate which aids both as a structural reinforcement and a fluid deflector.
Figure 6:
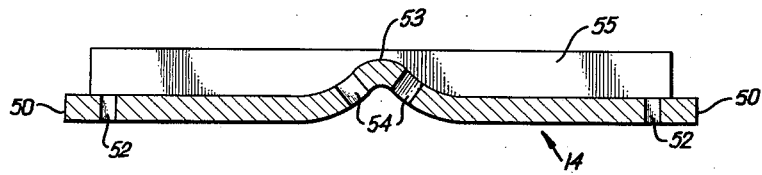
FIG. 6 is a cross-section of FIG. 5 along lines 6—6.

Referring to FIG. 5 and FIG. 6, a modification of grid 14 is shown having opposite sides 50 and opposite ends 51. The power agitators are mounted above and parallel to sides 50 such that the cleaning fluid is directed to flow normal to the sides 50 and parallel to the ends 51. As the fluid is forced from the power agitator adjacent to sides 50, it flows at a very high velocity over slot 52; the flow is parallel to and in the plane of the grid and, therefore, normal to the slot 52 such that the fluid from the sump below the grid 15 is aspirated from the sump and up into the flow stream above the grid. As the fluid flows over the grid from the side 50 it tends to lose velocity from friction of the solution on the grid and from internal viscosity so that as it approaches the center of the tank it is traveling at a much lower velocity than at the sides 50. At the center of the grid and along a line parallel to the sides 50 is a raised portion or ridge which acts both as a strengthening member for the grid and as a deflector for the flow of the cleaning solution above the grid. As a number of slots 54 have been cut in the sloping face of the ridge 53 such that part of the solution that passes over the ridge will tend to be forced into the sump below the grid 14. Fixably attached to the grid 14 are a pair of basket or parts rests 55 which are so placed that they are parallel and adjacent to ends 51 so that the major plane of the basket rests 55 is parallel to the flow of fluid and will not interfere therewith. It is the purpose of the basket rests 55 that they shall hold the basket of work to be cleaned above the grid 14 and therefore permit the fluid to flow between the grid and the basket of work without obstruction by the basket of work.

The effectiveness of the grid of my invention was determined by comparative testing with the old type open grid in which approximately 90% of the area of the grid was open space for communication between the cleaning area and the sump; the remaining 10% of the area consisted of the metallic structure of the grid itself. The outstanding results achieved with my grid will be apparent from the following examples:

Example A

A test was made in a tank constructed essentially the same as that shown in FIGS. 1 and 2. The tank volume was about 400 gallons. The tank was filled with water to which was added 200 lbs. of sand and 100 lbs. of finely divided precipitated manganese dioxide; also added to the tank for purposes of suspending the solids was 400 lbs. of soda ash. The test was first conducted with the conventional open type grid. The tank was agitated for 8 hours. At the end of this time, while agitation continued, a sample of the fluid in the tank was taken from a point near the geometric center of the tank. This solution was immediately poured into a 100 mil graduate and permitted to settle for 24 hours. The volume of the sludge in the bottom of the graduate was found to be about 2 mil and from visual examination was found to be principally manganese dioxide with a few grains of sand. The tank was then drained and the sump was examined for sludge volume.

The tank was then rinsed with water until all the sludge was removed and the tank was clean. The test was then repeated in its entirety using the grid of my invention of essentially the same design as that shown in FIGS. 1 and 2. After the sample was removed and let settle in the 100 mil graduate, less than 0.5 mil of sludge was found to remain and this sludge contained no observable sand. The tank was drained and the grid removed for visual examination of the sump. It was found that the sump contained approximately twice the volume of sludge as that retained by the sump using the conventional grid.

Example B

A tank of essentially the same volume as that utilized in Example A was charged with a chlorinated hydrocarbon based solvent cleaner and carbon removing compound. The tank was equipped with propellers attached to motors which were connected to reversing switches so that the propellers were running in one direction for a period of five minutes and then reversed for five minutes so that the direction of flow of solution across the grid was reversed every five minutes. A conventional grid was employed in the tank and diesel engine parts were cleaned for seven days. A sample of the solution was then taken from the tank near the geometric center of the tank and while the agitation was continued. One hundred mil of the sample was placed in a one hundred mil graduate and allowed to settle for a period of 24 hours, the sample was examined and found to contain 4 mil of flocculent sludge in the bottom of the graduate.

Immediately after the above noted sample was removed from the tank, the open type grid was removed and a grid of essentially the same construction as that shown in FIGS. 3 and 4, with holes one inch in diameter without any deflector plates on the center holes was placed in the tank. The tank was run with the same procedure as that used employing the conventional grid. At the end of 8 hours, a sample was taken from approximately the geometric center of the tank during agitation and was placed in a 100 mil graduate. After settling for 24 hours, only about 1 mil of sludge had settled out in the bottom of the graduate. The settling of suspended matter was essentially complete as was evidenced by the clarity of the solvent. Therefore, it is obvious that the use of the grid of my invention was effective in almost completely removing the suspended matter which was present in the cleaning solution because of the inefficiencies of the conventional grid.

It was also observed that improved cleaning results were achieved employing my grid on a fixed time cleaning schedule per part as determined by the final clean-up time after removal from the agitated tank; that is, the time required to manually remove last traces of carbon and dirt remaining on the parts was greatly reduced. This result is believed due to the improved flow over my closed grid compared to the great power losses resulting from the turbulence in flowing the fluid over the open type conventional grid. In other words, the power was more efficiently utilized at the surface of the parts to be cleaned rather than in creating turbulence in the solution adjacent to the open-type grid.

These examples show that even though the grid of my invention has very small areas of communication between the sump and the cleaning area and is admittedly inefficient for settling of sludge in an unagitated condition, that the efficiency for entrapment of the sludge in agitated tanks wherein there is a component of flow across its surface is superior to the conventional open faced grid.

The maximum area of communication between the sump and the cleaning area which I have found to perform efficiently in accordance with my invention is about 25%; that is, the area of the plate used for forming my grid will have about 25% or less of open area for the sludge to pass into the sump. It is also a requirement of my grid that for greatest efficiency the open areas will be located principally near the center of the tank and adjacent to the sides of the tank from which the agitation is developed, in the case of oppositely disposed agitators. In the event only one agitator is employed, the open areas will be predominately adjacent to the agitators and adjacent to the opposite side where the velocity of flow is the lowest across the surface of the grid.

Although it is conceivable that different types of mounting of agitators are possible, it is the gist of my invention that the fluid will be aspirated from the sump through holes in the area of highest agitation, which is near the source of agitation and that the solution will be sucked into the sump through holes in the grid at the area of lowest velocity and that it is in these two areas that the holes in the grid will be employed or that the fluid will be forced into the sump through openings adjacent to the source of agitation and be removed by displacement through openings adjacent to the areas of least agitation or velocity.

I claim:

1. Apparatus for separating particulate matter from an agitated liquid, which comprises a main cleaning tank, a sump chamber positioned below said cleaning tank, a grid mounted in a substantially horizontal plane at the lower end of said main tank and separating said main tank from said sump chamber, an agitator positioned in said main tank above said grid, a first series of perforations in said grid, located adjacent said agitator, the axes of said perforations being inclined at an angle to the horizontal plane of said grid, the extension of said axes above said grid having a horizontal component parallel to and in the direction of flow of fluid in said main tank adjacent said grid, produced during actuation of said agitator, and a second series of perforations in said grid, spaced from said first series of perforations and at a distance from said agitator further than said first perforations, the axes of said second series of perforations being inclined at an angle to the horizontal plane of said grid, the extension of said axes above said grid having a horizontal component parallel to and in a direction opposite to the flow of fluid in said main tank adjacent said grid, produced during actuation of said agitator, the total area of said perforations being substantially less than the solid area of said grid.

2. Apparatus for separating particulate matter from an agitated liquid, which comprises a main cleaning tank, a sump chamber positioned below said cleaning tank, a grid mounted in a substantially horizontal plane at the lower end of said main tank and separating said main tank from said sump chamber, an agitator positioned in said main tank above said grid, a first series of perforations in said grid, located adjacent said agitator, the axes of said perforations being inclined in one direction at an angle to the horizontal plane of said grid, the extension of said axes above said grid having a horizontal component parallel to the flow of fluid in said main tank adjacent said grid, produced during actuation of said agitator, and a second series of perforations in said grid, spaced from said first series of perforations and at a distance from said agitator further than said first perforations, the axes of said second series of perforations being inclined in the opposite direction from the axes of said first series of perforations, at an angle to the horizontal plane of said grid, the extension of said axes above said grid having a horizontal component parallel to the flow of fluid in said main tank adjacent said grid, produced during actuation of said agitator, the total area of said perforations being substantially less than the solid area of said grid.

3. Apparatus as defined in claim 2, including two sets of said first and second series of perforations in said grid, the first series of one of said sets being located adjacent one end of said grid and the second series of said one set being positioned adjacent the center of said grid, the first series of the other set being located adjacent the other end of said grid and the second series of said other set being positioned adjacent the center of said grid, and including two agitators, one of said agitators being positioned in one end of said main tank adjacent said one end of said grid, and the other agitator being positioned in the other end of said main tank adjacent said other end of said grid.

4. Apparatus for separating particulate matter from an agitated liquid, which comprises a main cleaning tank, a sump chamber positioned below said cleaning tank, a grid mounted in a substantially horizontal plane at the lower end of said main tank and separating said main tank from said sump chamber, an agitator positioned in said main tank above said grid, a first series of perforations in said grid, located adjacent said agitator, the axes of said perforations being inclined at an angle to the horizontal plane of said grid, the extension of said axes above said grid having a horizontal component parallel to and in a direction opposite to the flow of fluid in said main tank adjacent said grid, produced during actuation of said agitator, and a second series of perforations in said grid, spaced from said first series of perforations and at a distance from said agitator further than said first perforations, the axes of said second series of perforations being inclined at an angle to the horizontal plane of said grid, the extension of said axes above said grid having a horizontal component parallel to and in the direction of flow of fluid in said main tank adjacent said grid, produced during actuation of said agitator, the total area of said perforations being substantially less than the solid area of said grid.

References Cited in the file of this patent

UNITED STATES PATENTS

| | | |
|---|---|---|
| 1,714,338 | Yelmgren | May 21, 1929 |
| 1,788,383 | Delery | Jan. 13, 1931 |
| 2,600,696 | Schmidt | June 17, 1952 |
| 2,746,467 | Dempsey et al. | May 22, 1956 |
| 2,960,991 | Bland | Nov. 22, 1960 |